(12) United States Patent
Shi

(10) Patent No.: US 9,212,777 B2
(45) Date of Patent: Dec. 15, 2015

(54) QUICK CLAMPING DEVICE

(76) Inventor: Chuanwen Shi, Wuyang County (CN)

( * ) Notice: Subject to any disclaimer, the term of this patent is extended or adjusted under 35 U.S.C. 154(b) by 174 days.

(21) Appl. No.: 13/824,905

(22) PCT Filed: Apr. 16, 2012

(86) PCT No.: PCT/CN2012/000515
§ 371 (c)(1),
(2), (4) Date: Mar. 18, 2013

(87) PCT Pub. No.: WO2013/120233
PCT Pub. Date: Aug. 22, 2013

(65) Prior Publication Data
US 2014/0003862 A1  Jan. 2, 2014

(30) Foreign Application Priority Data

Feb. 16, 2012  (CN) ................... 2012 2 0050081 U

(51) Int. Cl.
*F16M 11/04* (2006.01)
*F41G 11/00* (2006.01)
(Continued)

(52) U.S. Cl.
CPC .............. *F16M 11/041* (2013.01); *F16B 2/10* (2013.01); *F16M 13/022* (2013.01); *F41G 11/003* (2013.01); *F41G 11/004* (2013.01); *Y10T 403/595* (2015.01)

(58) Field of Classification Search
USPC ........... 403/289, 290, DIG. 9, 110, 196, 234, 403/240, 256, 261, 338, 373, 374.1, 374.2, 403/374.3, 374.4, 374.5, DIG. 4; 285/148.8, 285/148.17, 148.26, 148.28, 154.3, 154.4, 285/180, 197, 205, 206, 207, 217, 236, 241, 285/242, 252, 326, 337, 364, 406, 420, 285/421; 24/24, 20 S, 21, 335, 339, 336, 24/337; 248/229.1, 229.12, 229.13, 248/229.14, 74.4; 42/124, 127
See application file for complete search history.

(56) References Cited

U.S. PATENT DOCUMENTS 3,523,669 A * 8/1970 Avallone ........................ 248/73
4,492,005 A * 1/1985 Begley et al. ................... 24/270
(Continued)

FOREIGN PATENT DOCUMENTS

CN  102052882  5/2011
DE  339083  7/1921
(Continued)

OTHER PUBLICATIONS

International Search Report and Written Opinion issued in corresponding International Application No. PCT/CN2012/000515 on Nov. 15, 2012.

*Primary Examiner* — Daniel P Stodola
*Assistant Examiner* — Matthieu Setliff
(74) *Attorney, Agent, or Firm* — Ascenda Law Group PC

(57) ABSTRACT

A quick clamping device, including a semi-circular base and a screw running through the bottom part of the base. One end of the screw extends out of the base and is connected to an eccentric wheel via a conical shaft pin. The eccentric wheel is provided with a handle. On the screw, a fixture block and a wedged sliding block are provided, with the wedged sliding block being adjacent to the eccentric wheel and the fixture block being adjacent to the wedged sliding block. The top part of one end of the base is connected to a buckle via two connecting blocks and the top part of the other end of the base is connected to a top cover. A protruding block is provided on the top of the top cover. The free end of the buckle is provided with a groove that matches the protruding block. The connections between the top part of one end of the base and each connecting block, between each connecting block and the buckle, and between the top part of the other end of the base and the top cover are all movable through a quick removal pin. Two springs are provided on the upper surface of the top part of one end of the base.

3 Claims, 2 Drawing Sheets

(51) Int. Cl.
  *F16M 13/02* (2006.01)
  *F16B 2/10* (2006.01)

(56) References Cited

U.S. PATENT DOCUMENTS

| | | | |
|---|---|---|---|
| 4,573,717 A * | 3/1986 | Peacock | 285/365 |
| 4,657,284 A * | 4/1987 | Fiori | 285/39 |
| 5,295,933 A * | 3/1994 | Ciminski et al. | 482/107 |
| 5,620,210 A * | 4/1997 | Eyster et al. | 285/81 |
| 6,096,956 A * | 8/2000 | Hoshino | 84/421 |
| 6,305,868 B1 * | 10/2001 | Kinoshita et al. | 403/49 |
| 6,773,172 B1 | 8/2004 | Johnson | |
| 6,972,042 B2 * | 12/2005 | Benson | 623/38 |
| 7,077,582 B2 * | 7/2006 | Johnson | 396/428 |
| 7,314,331 B1 * | 1/2008 | Koros et al. | 403/396 |
| 7,399,007 B2 * | 7/2008 | Wu | 285/420 |
| 7,562,484 B2 * | 7/2009 | Kim | 42/114 |
| 7,823,316 B2 * | 11/2010 | Storch et al. | 42/90 |
| 8,171,666 B2 * | 5/2012 | Karagias | 42/124 |
| 8,397,421 B2 * | 3/2013 | Ding et al. | 42/124 |
| 2005/0141957 A1 * | 6/2005 | Chen | 403/290 |
| 2011/0023348 A1 | 2/2011 | Karagias | |

FOREIGN PATENT DOCUMENTS

| | | | |
|---|---|---|---|
| DE | 3520952 C1 * | 10/1986 | F16L 33/22 |
| EP | 2196720 | 6/2010 | |

* cited by examiner

QUICK CLAMPING DEVICE

FIELD OF THE INVENTION

This invention relates to a quick clamping device used to clamp accessories such as aiming devices, electric torches, and laser devices etc.

BACKGROUND OF THE INVENTION

At present, all supports available on the market used to fix accessories such as aiming devices, laser devices, and electric torches etc. consist of an upper part and a lower part, or an integral piece, and adopt threads for fixing and locking, which require the use of a spanner. As tools such as a spanner are not easy to carry and may be lost, it will not be possible to clamp if the tool is lost.

SUMMARY OF THE INVENTION

The purpose of this invention is to overcome such shortcomings and provide a quick clamping device with a compact structure and easy operation, without the need to use any tool.

This invention is implemented using the following technical solutions:

A quick clamping device, including a semi-circular base and a screw running through the bottom part of said base; one end of said screw extends out of said base and is connected to an eccentric wheel via a conical shaft pin; said eccentric wheel is provided with a handle; on said screw, a fixture block and a wedged sliding block are installed, with said wedged sliding block being adjacent to said eccentric wheel and said fixture block being adjacent to said wedged sliding block; the top part of one end of said base is connected to a buckle via two connecting blocks and the top part of the other end of said base is connected to a top cover; a protruding block is provided on top of said top cover; and the free end of said buckle is provided with a groove that matches said protruding block.

A further improvement by this invention is that all the connections between the top part of one end of said base and each connecting block, between each connecting block and said buckle, and between the top part of the other end of said base and said top cover are all movable through a quick removal pin.

Another further improvement of this invention is that two springs are provided on the upper surface of the top part of one end of said base.

Compared with the prior art, this invention has the following advantages. In the device of this invention, the top cover directly clamps an object (an accessory such as an aiming device, an electric torch, and a laser device etc.) without the need to use other tools. When this device is not used, the top cover can be directly buckled and will not get loose and fall apart, which facilitates carrying.

Legends in the figures: 1—buckle; 2—top cover; 3—eccentric wheel; 4—conical shaft pin; 5—wedged sliding block; 6—fixture block; 7—screw; 8—base; 9—spring; 10—connecting block; 11—quick removal pin; 12—protruding block; 13—groove; 14—handle.

PREFERRED EMBODIMENT

To deepen the understanding of this invention, the following describes the invention in detail in combination with the attached figures and a preferred embodiment. This preferred embodiment is only meant to explain this invention, not to limit the protected scope of this invention.

Figure 1:
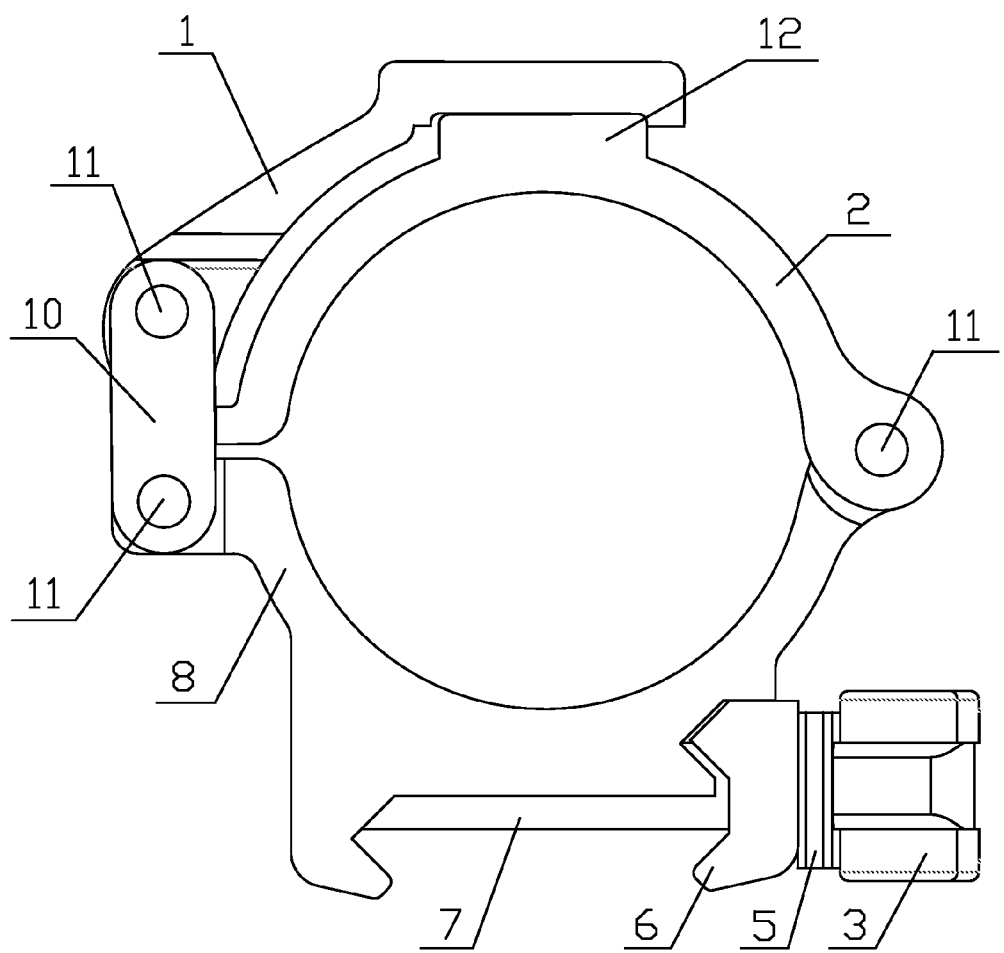
FIG. 1 is a structural schematic of the device of this invention at a closed position.
Figure 2:
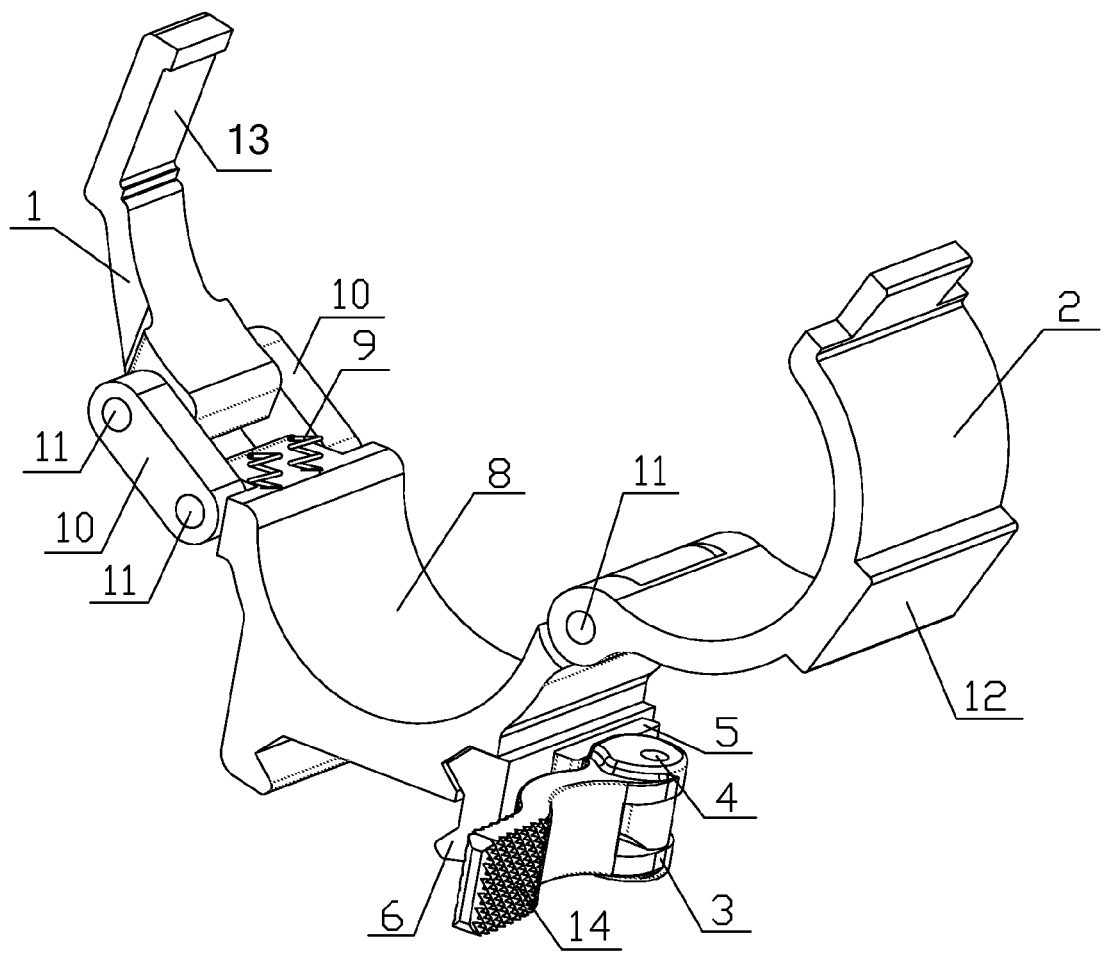
FIG. 2 is a structural schematic of the device of this invention at an open position.

In FIG. 1 and FIG. 2, a preferred embodiment of the quick clamping device of this invention is shown, including a semi-circular base 8 and a screw 7 running through the bottom part of said base 8. One end of said screw 7 extends out of said base 8 and is connected to an eccentric wheel 3 via a conical shaft pin 4. Said eccentric wheel 3 is provided with a handle 14. A fixture block 6 and a wedged sliding block 5 fit over said screw 7 with said wedged sliding block 5 being adjacent to said eccentric wheel 3 and said fixture block 6 being adjacent to said wedged sliding block 5. The top part of one end of said base 8 is connected to a buckle 1 via two connecting blocks 10. The top part of the other end of said base 8 is connected to a top cover 2. A protruding block 12 is provided on the top of said top cover 2, and the free end of said buckle 1 is provided with a groove 13 that matches said protruding block 12. The connections between the top part of one end of said base 8 and each connecting block 10, between each connecting block 10 and said buckle 1, and between the top part of the other end of said base 8 and said top cover 2 are all movable through a quick removal pin 11. One end of the buckle is a free end, while the other end is connected to the connecting blocks via quick removal pins. The connection end of the buckle adopts an eccentric wheel structure. The connecting blocks are connected to the base via quick removal pins. The top cover is connected to the base via a quick removal pin. One end of the screw has an elliptical platform and is snapped onto the base via the snap groove in the base, so that it cannot rotate. The other end of the screw is connected to the eccentric wheel via a conical shaft pin. Between the eccentric wheel and the base, a wedged sliding block and a fixture block are provided. Two springs 9 are provided at the end of the base connecting the connecting blocks. The two springs 9 are provided on the upper surface of the top part of one end of the base 8. When the device of this invention is not used to clamp an accessory such as an aiming device, these springs will support the free end of the top cover and further withstand the connection end of the buckle, so that the top cover will not get loose and fall apart, which facilitates carrying.

If the eccentric wheel is installed at the left side of this device, the end of this eccentric wheel with the smaller eccentricity is placed adjacent to the wedged sliding block. At this time, the handle is away from the user. Then, the whole device is snapped onto the guide rail via the fixture block at the lower part of the base and the screw is snapped into the guide rail groove. When the eccentric wheel is turned, due to the eccentricity, the eccentric wheel will gradually press tightly against the wedged sliding block and the fixture block until it is fully tightened. Due to the variation in the width of the guide rail, the clamping tightness is adjusted through the forward and backward positions of the wedged sliding block. If the eccentric wheel is installed at the right side of this device, the end of the eccentric wheel with the smaller eccentricity is placed adjacent to the wedged sliding block. Push the eccentric wheel so that the elliptical end at the other end of the screw is disengaged from the snap groove in the base. Turn the eccentric wheel by 180 degrees so that the screw is driven by the eccentric wheel to turn by 180 degrees. Without rotating the wedged sliding block or the fixture block, loosen the eccentric wheel so that the screw is snapped in the snap groove in the base. The lower part of the base is fixed on the guide rail via the fixture block. Loosen the eccentric wheel; at this time, the fixture block is loose and the base can be freely installed on the guide rail, and at this time, it is in a released state. Use the handle to turn the eccentric wheel so that the fixture block is gradually clamped tightly on the guide rail, and at this time, it is in a locking state. Since the guide rail width varies, the position of the oblique wedge can be adjusted forward or backward to reach a suitable position, then the eccentric wheel is pressed tightly, so that the base is fixed on the guide rail. This invention is applicable to guide rails of different dimensions without the use of any tool, namely suitable to fit both very wide and very narrow guide rails.

To clamp an aiming device or another accessory using the clamping device of this invention, first loosen the buckle and open the top cover. Place the aiming device or other accessory on the base and close the top cover to clamp it. Horizontally push the buckle and the connecting block connection end onto the free end of the top cover, and press the buckle down so that the groove in the free end of the buckle is fully engaged with the protruding block on the top part of the top cover. In the device of this invention, the top cover directly clamps the accessory (an aiming device, an electric torch, or a laser device etc.), without the need to use any other tool. When this clamping device is not used, the top cover can be directly closed, hence it will not get loose and fall apart, which facilitates carrying.

The invention claimed is:

1. A quick clamping device, comprising:
    a semi-circular base, wherein the bottom of said base defines a downwardly facing channel positioned for fitting a guide rail; and
    a screw running through the bottom part of said base; one end of said screw extends out of said base and is connected to an eccentric wheel via a conical shaft pin; wherein said eccentric wheel is provided with a handle;
    wherein on said screw, a fixture block and a sliding block are mounted, with said sliding block being adjacent to said eccentric wheel and said fixture block being adjacent to said sliding block, wherein said sliding block has tapering thickness and is movable, and wherein said sliding block permits adjustment of the width of said channel;
    wherein the top part of one end of said base is connected to a buckle via two connecting blocks and the top part of the other end of said base is connected to a top cover;
    wherein a protruding block is provided on the top of said top cover, and a free end of said buckle is provided with a groove that matches said protruding block,
    wherein at least one spring is provided on the upper surface of one end of said base, said spring is in direct contact with the upper surface of said base, wherein the entire spring is positioned between said buckle and said base, and is between said two connecting blocks, the spring urging the free end of said buckle to be engaged with said top cover.

2. The quick clamping device of claim 1, wherein all connections between the top part of one end of said base and each said connecting block, between each said connecting block and said buckle, and between the top part of the other end of said base and said top cover are movable through a quick removal pin.

3. The quick clamping device of claim 1, wherein two springs are provided on the upper surface of the top part of one end of said base.

* * * * *